United States Patent
Walker

(10) Patent No.: US 7,802,350 B2
(45) Date of Patent: Sep. 28, 2010

(54) FLANGE HOLE REPAIR

(75) Inventor: David E. Walker, Rochester, NH (US)

(73) Assignee: United Technologies Corporation, Hartford, CT (US)

( * ) Notice: Subject to any disclaimer, the term of this patent is extended or adjusted under 35 U.S.C. 154(b) by 573 days.

(21) Appl. No.: 11/881,684

(22) Filed: Jul. 27, 2007

(65) Prior Publication Data

US 2009/0293253 A1   Dec. 3, 2009

(51) Int. Cl.
*B23P 6/00* (2006.01)
(52) U.S. Cl. .................. 29/402.13; 29/402.01; 29/889.1
(58) Field of Classification Search ............. 29/402.01, 29/402.04, 402.06, 402.07, 402.09, 402.13, 29/402.16, 402.18, 402.19, 889.1
See application file for complete search history.

(56) References Cited

U.S. PATENT DOCUMENTS

| | | | |
|---|---|---|---|
| 3,623,129 A | 11/1971 | Miles | |
| 5,111,570 A | 5/1992 | Baumgarten et al. | |
| 6,161,751 A * | 12/2000 | Smith et al. | 228/125 |
| 6,489,583 B1 | 12/2002 | Nowak et al. | |
| 2008/0105659 A1 * | 5/2008 | Arnett et al. | 219/121.14 |

* cited by examiner

*Primary Examiner*—David P Bryant
*Assistant Examiner*—Bayan Salone
(74) *Attorney, Agent, or Firm*—Kinney & Lange, P.A.

(57) ABSTRACT

The invention is a method of repairing an aperture and adjacent defect in a part which is started by removing one or more defects adjacent an aperture in a base material. The material is removed to create a weld seam that extends past an area of high stress concentration on the aperture. An insert of material containing a profile that corresponds to the profile of the base material removed adjacent the aperture and a combination top and runoff plate that encompasses the insert of material are provided. The insert of material is tack welded to the combination plate to assure a gap of less than about 0.003 inches between the combination plate and the insert. A backing plate is inserted underneath the combination top and runoff plate and insert such that there remains an air space between the backing plate and the combination plate which prevents the combination plate from becoming fused to the backing plate during a welding process. The insert is welded to the base material, and the backing plate is removed. Excess material is removed from the insert to obtain an aperture containing a profile essentially the same as the profile of the aperture prior to initiating the repair.

15 Claims, 7 Drawing Sheets

FLANGE HOLE REPAIR

CROSS-REFERENCE TO RELATED APPLICATION(S)

This application is commonly assigned with application Ser. No. 11/588,786, filed on Oct. 27, 2006, which is hereby incorporated by reference as if set forth fully herein.

BACKGROUND

The present invention relates to the repair of turbine engine components, and in particular to the repair of small diameter holes located on the flange of a part such as the forward inner nozzle support.

During operation of a turbine engine, the forward inner nozzle support can be damaged. Repairs must be done to the nicks and surface imperfections caused during normal operation. One common repair is cracks that emanate from the small diameter holes on the front flange of the forward inner nozzle support.

There are many techniques known in the art for repairing larger diameter holes, such as bolt holes about 0.30" or greater in diameter. As shown in FIG. 1, in one such prior art repair, an area on a line about 45° on either side of the radial center line RC of hole 11 is removed. This material is then replaced with wedge 13 constructed of a similar material as the base material of the part being repaired. Wedge 13 contains at least two sides 17, 19 that are at approximately 90 degrees to one another. The remaining geometry of the wedge is not critical to the repair, and the remaining side(s) 21, can be of varying shapes and angles. This approximately perpendicular corner is inserted into the area of removed base material, the corner mating with edges 23, 25 of the base material left on the part. Wedge 13 is surrounded by three runoff plates 27, 29, and 31. Additionally, a backing plate may be used in the repair. Thus, five separate pieces are required to initiate the repair. Wedge 13 and run off plates 27, 29, and 31 are attached by tack welds 33 prior to initiating the repair. The multiple run off plates 27, 29, and 31 are small and difficult to assemble about wedge 13.

In the prior art repair, wedge 13 is welded into place with welds that are approximately 45 degrees from the original base material. In this configuration, the welds move the weld material (the weld zone with depleted material properties) outboard of the highest stressed areas at the hole location. This allows the raw material of the replacement wedge (with base materials properties) to remain in the highest stressed areas. The highest stressed areas surrounding the hole are located approximately 90 degrees from one another. This repair works well for holes down to about 0.30 inches in diameter, but on smaller holes the wedge becomes so small that the weld used to retain the wedge extends into the highest stressed areas of the flange. Thus, a better repair for smaller diameter holes on flanges is needed.

SUMMARY

In one embodiment, the invention is a method of repairing an aperture and adjacent defect in a flange which is started by removing a defect adjacent an aperture. Material is removed to create a weld seam that extends past an area of high stress concentration on the aperture. An insert of material and a combination plate that encompasses the insert of material are provided. The insert of material is tack welded to the combination plate to assure a gap of less than about 0.003 inches between the combination plate and the insert. A backing plate is inserted underneath the combination plate and insert such that there remains an air space between the backing plate and the combination plate which prevents the combination plate from becoming fused to the backing plate during a welding process. The insert is welded to the base material, and the backing plate is removed. Excess material is removed from the insert to obtain an aperture containing a profile essentially the same as the profile of the aperture prior to initiating the repair.

In another embodiment, the invention is a method of repairing an aperture and adjacent defect which is initiated by removing the defect while leaving a portion of the aperture. An insert and combination plate are provided. The insert is tacked to the combination plate such that there is one tack weld on each side of the remainder of the aperture and the edge of the flange. The insert and combination plate are welded to the base material of the flange. Excess material is removed from the insert to obtain an aperture containing a profile essentially the same as the profile of the aperture prior to initiating the repair.

DETAILED DESCRIPTION

Figure 1:
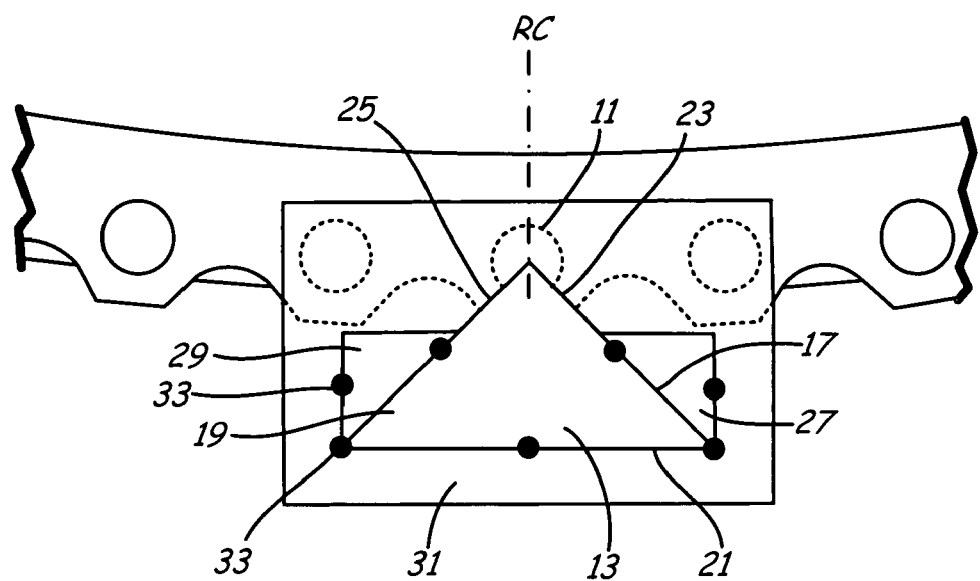
FIG. 1 is a plan view of a prior art repair for a hole utilizing a wedge and multiple run off plates.
Figure 2:
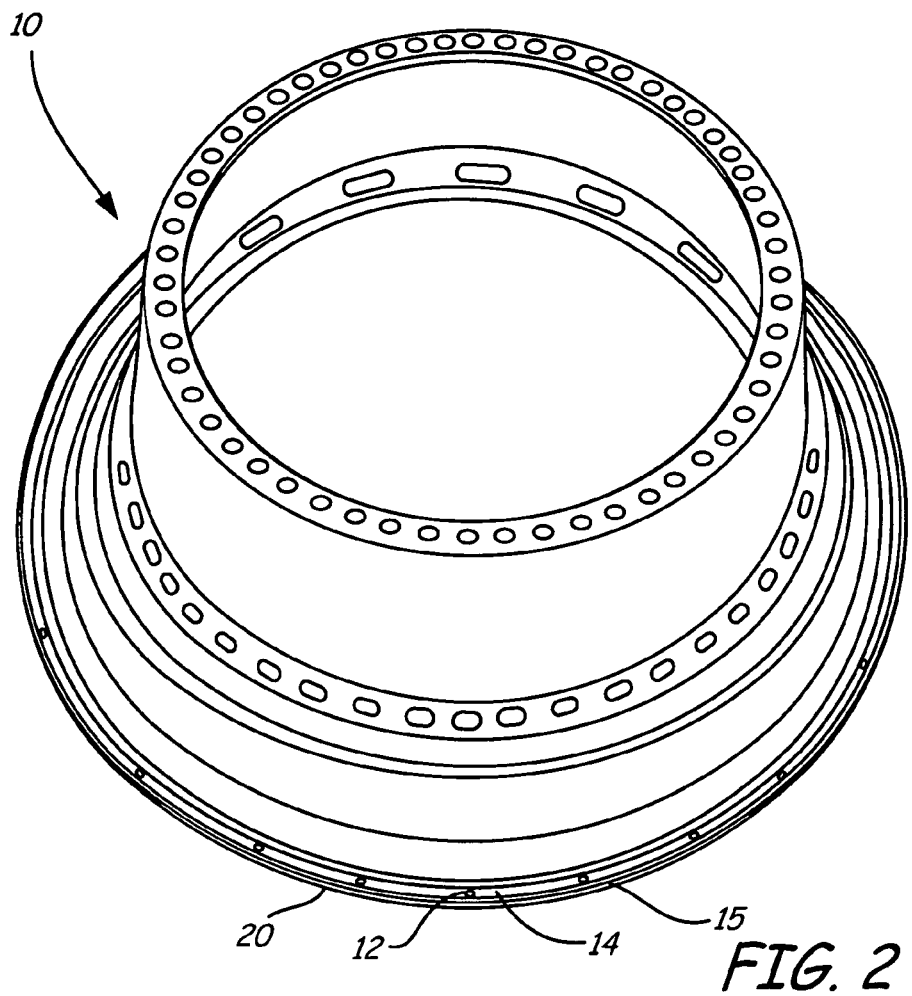
FIG. 2 is a perspective view of a forward inner nozzle support of a dual annular combustor configuration of a high pressure turbine.
Figure 2A:
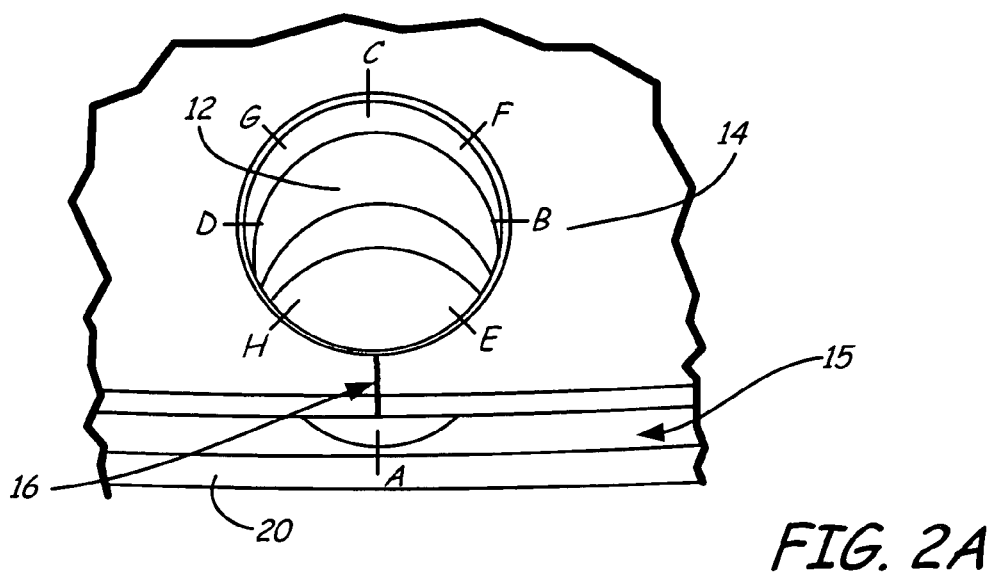
FIG. 2A is a magnification of an area of the perspective view of the nozzle support illustrating a crack at one of the flange bolt holes.

FIG. 2 is a perspective view of a forward inner nozzle support 10 of a dual annular combustor (DAC) of a higher pressure turbine. The nozzle support 10 contains a series of small diameter holes 12 circumferentially spaced about an outer diameter flange 14. Holes 12 are apertures used to receive small diameter pins or bolts for additional parts that are mounted to the flange. FIG. 2A is a closeup view of the nozzle support 10 illustrating a crack 16 at one small diameter hole 12 on flange 14. Cracks 16 typically emanate from the holes 12 in an outward radial direction. In the past, cracks 16 in small diameter holes 12 of nozzle support 10 were unrepairable.

Figure 3:
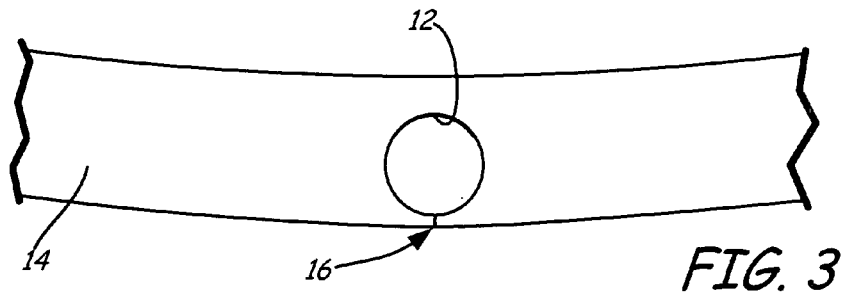
FIG. 3 is a plan view illustrating a defect adjacent an aperture on a flange.

FIG. 3 is a plan view illustrating defect 16 adjacent hole 12 on flange 14. Hole 12 is an aperture through flange 14 which is capable of receiving a pin or bolt to fasten another object to the nozzle support 10. In the embodiment illustrated, hole 12 is circular, although other aperture profiles are envisioned. Hole 12 is a small diameter aperture, less than about 0.30 inches in diameter.

Flange 14 is constructed from a heat resistant base material. The base material is a super alloy, such as a nickel-based or cobalt-based superalloy, or other alloys common in the gas turbine industry. Examples of alloys include Inconel 718 (IN718), IN617, IN625, Ti-6A1-4V and other titanium alloys, Al 6061 and 4043, Waspaloy, Astroloy, Udimet7 500, and HA230. Crack 16 is the result of thermal stress that often emanates from hole 12 to the outer surface of flange 14.

Figure 4:
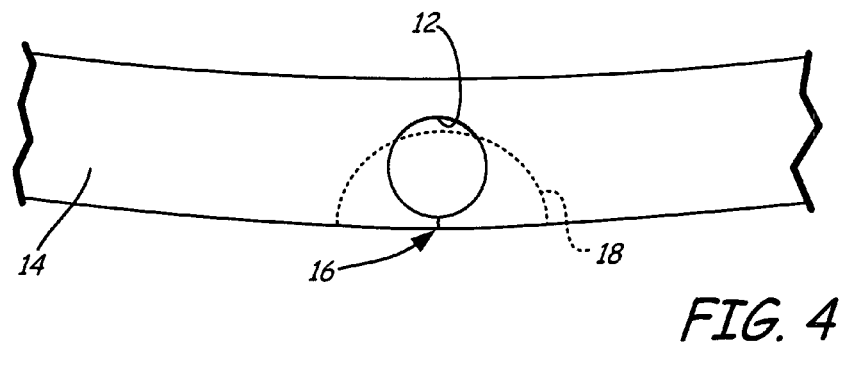
FIG. 4 is a plan view illustrating a portion of the flange to be removed.

FIG. 4 is a plan view illustrating a portion 18 of flange 14 to be removed. Portion 18 of flange 14 is extracted by common techniques known to those of skill in the art for material removal, such as laser cutting or machining. Portion 18 is to be removed in a parabola centered about an axis that runs through the diameter of hole 12, without completely removing the hole 12. The material is removed by cutting perpendicular to the top surface of flange 14. Removing material in the shape of a parabola or similar shape removes the defect and provides an attachment surface outside the high stress zones which are adjacent hole 12. Typically, the position of a hole located nearest the outer edge of the flange, or perpendicular to the outer edge, as well as areas offset 90 degrees, 180 degrees, and 270 degrees therefrom, contain the highest stresses (See A, B, C, and D, respectively, FIG. 2A). Creating a repair where the weld seams fall between these areas (at approximately 45 degrees, 135 degrees, 225 degrees, and 315 degrees) moves the welds out of high stress zones surrounding the hole 12 (See E, F, G, and H, of FIG. 2A). Moving the weld out of the high stress zones surrounding the hole 12 is similar to what occurs when large holes are repaired as described above. This assures good fatigue life for the repaired part.

Figure 5:
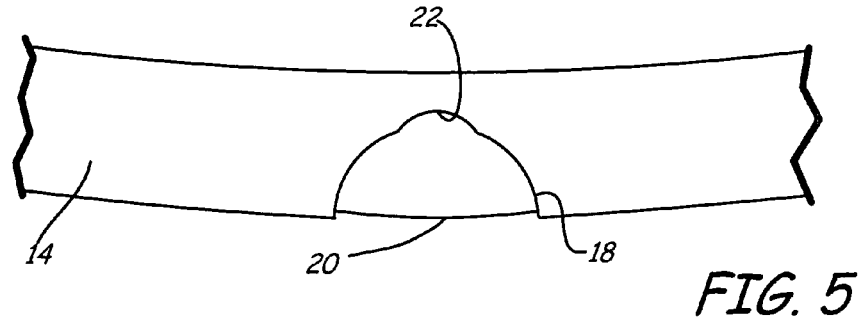
FIG. 5 is a plan view illustrating the portion of the flange removed and a parallel flange.

FIG. 5 is a plan view illustrating portion 18 of flange 14 removed, which reveals lower flange 20. With portion 18 removed, only a small arc 22 of the hole 12 is left. The remaining arc 22 acts as a guide and locator for finishing the repair to assure that the repaired hole is nominally placed in the same position on flange 14 as the original hole 12. Lower flange 20 is a parallel structure to flange 14, and a slot 15 exists between the two flanges 14 and 20, which run circumferentially around the base of the forward inner nozzle support (See FIGS. 2 and 2A).

Figure 6:
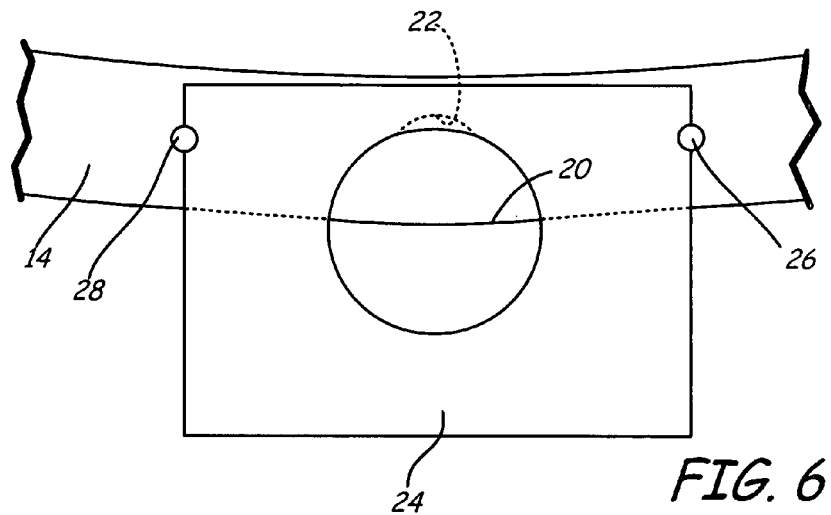
FIG. 6 is a plan view illustrating a combination runoff and top plate tacked to the flange.

FIG. 6 is a plan view illustrating a combination plate 24 (i.e., combination runoff and top plate) attached to flange 14. Combination plate 24 is attached to flange 14 by placing tack welds 26, 28 approximately midway axially of flange 14. Tack welds 26, 28 hold combination plate 24 temporarily in place. Also, tack welds can be easily removed later, without damaging flange 14, to remove combination plate 24. Combination plate 24 may be fabricated from the same material as the base material of flange 14, or a material that has consistent metallurgical properties. In the illustrated embodiments, combination plate 24 has a central portion removed that reveals lower flange 20, and covers arc 22. In alternate embodiments (not illustrated), combination plate 24 does not cover arc 22.

Figure 7:
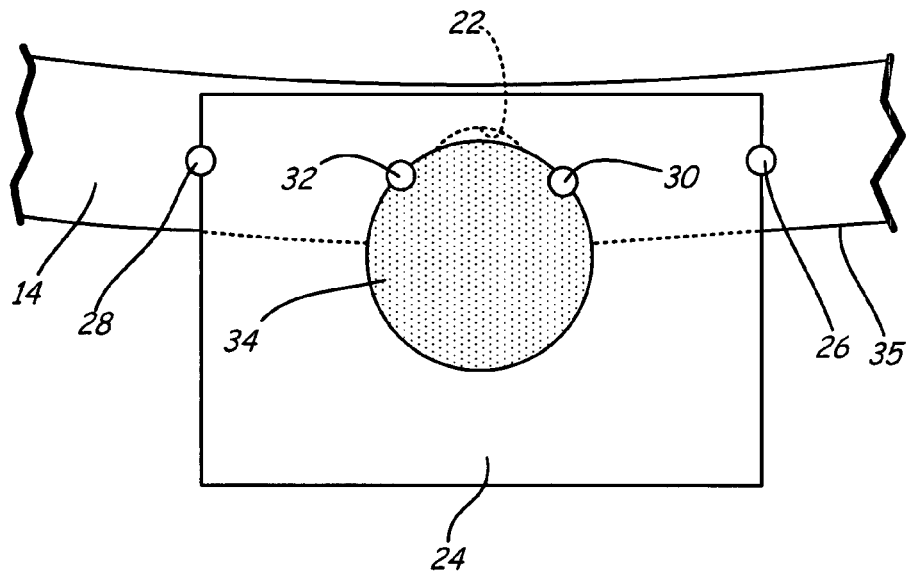
FIG. 7 is a plan view illustrating a biscuit insert tacked to the combination plate.

FIG. 7 is a plan view illustrating insert 34 attached to the combination plate 24 via tack welds 30, 32, which hold the insert 34 in place until the final welding process occurs. Insert 34 is a plug of material that is preferably the same material as, or contains the same metallurgical properties as, that of the base material of flange 14. Insert 34 is sized to be positioned against the edge of portion 18 of flange 14 previously removed (see FIG. 4), as well as mate with the profile of the aperture in combination plate 24. In the embodiment illustrated, insert 34 is circular. Although illustrated as circular, insert 34 may be elliptical, biscuit shaped, or have an arced portion that matches the profile of the removed material 18 of flange 14.

The maximum gap between the outer perimeter of the insert 34 and the parent material that has been weld prepped is preferably about 0.003 inches (0.076 mm). This low tolerance gap yields the best results with this weld repair. Thus, tack welds 30, 32 should be located with the low tolerance gap in mind. The placement of the welds should be about the perimeter of insert 34 in a position between outer edge 35 of flange 14 and the original placement of hole 12, as represented by arc 22. Tack welds 30, 32 are to be placed on opposite sides of where hole 12 previously existed. This position will assure that the correct gap is maintained between insert 34 and combination plate 24 and the remaining portion of flange 14. Tack welds 30, 32 are done using spot welding or a similar process that does not use a filler material. Tack welds 30, 32 should be of depth that does not exceed combination plate 24 thickness. When the weld is complete, tack welds 30, 32 will be incorporated into the final repair weld.

In embodiments, combination plate 24 is larger than the diameter of the hole 12 being repaired. In embodiments, combination plate 24 has a length (measurements of the sides generally parallel to the outer edge of flange 14) of at least two times the diameter of the original hole 12 (FIG. 2), and has a width (measurements of the sides generally perpendicular to the outer edge of flange 14) of at least two times the diameter of hole 12. The aforementioned dimensions of combination plate 24 assure good support for insert 34, and allow for locating tack welds 26, 28 an adequate distance from the repair weld(s) around insert 34.

Figure 8:
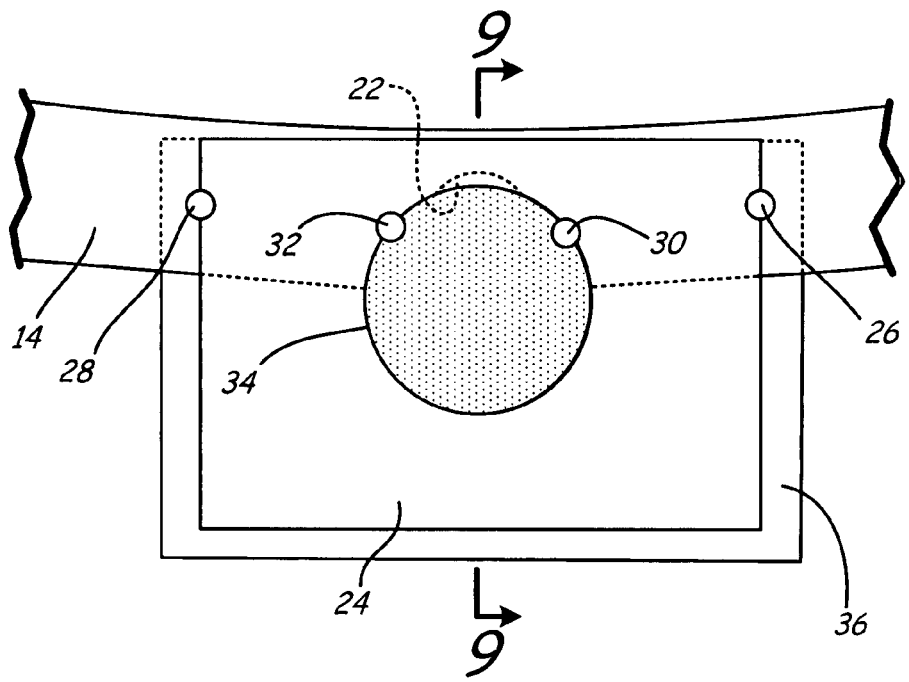
FIG. 8 is a plan view illustrating a backing plate placed below the combination plate and insert.

FIG. 8 is a plan view illustrating backing plate 36 placed below combination plate 24 and insert 34. Backing plate 36 may be fabricated from a similar metal that is used to construct combination plate 24 and insert 34. In alternate embodiments, backing plate 36 is constructed from a different metal, or a heat resistant material such as ceramic. In FIG. 8, backing plate 36 is illustrated as containing larger dimensions than combination plate 24, but backing plate 36 may be smaller in size than combination plate 24 so long as the backing plate 36 covers the area underneath where the repair weld is to be made. When backing plate 36 is larger than combination plate 24, backing plate 36 protects adjacent areas from weld run off or spatter, as well as protects lower flange 20 from penetration of the electron beam or other welding source.

Figure 9:
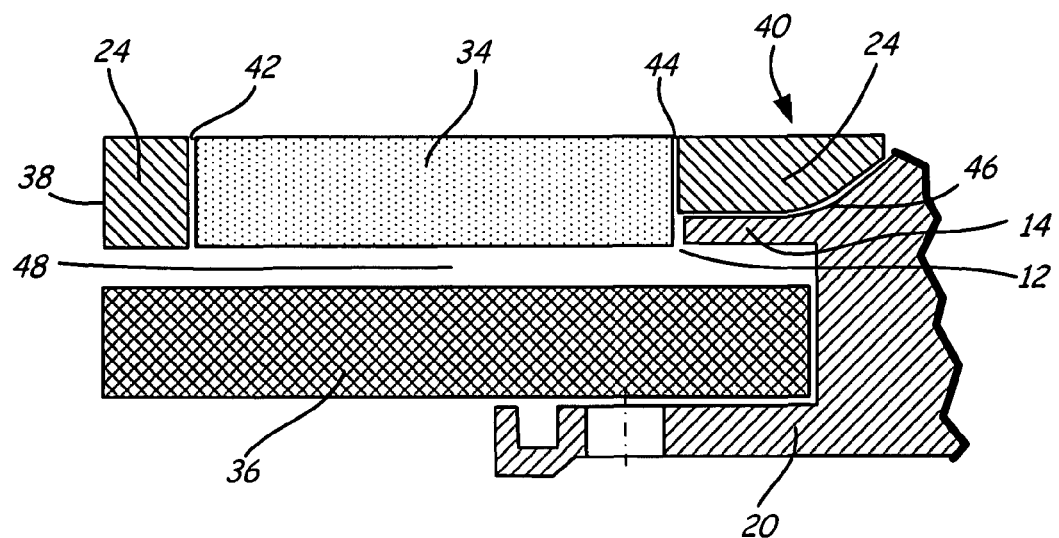
FIG. 9 is a cross-sectional elevation view of the bolt hole repair apparatus for refabrication of the flange of the nozzle support illustrated in FIG. 7.

FIG. 9 is a cross-sectional elevation view of the bolt hole repair apparatus for refabrication of flange 14 illustrated in FIG. 8. In this view, the remaining portion of the base material of flange 14 is visible. Also illustrated are insert 34, combination plate 24, and backing plate 36. Insert 34 is a thickness that is approximately equivalent to the thickness of the rear edge 38 of combination plate 24, which is also approximately equivalent to the thickness of the front end 40 of combination plate 24 added to the thickness of the remnant of hole 12 left on flange 14. Small clearance gaps 42, 44 exist between insert 34 and plate 24. Clearance gaps 42, 44 should be as small as possible to assure a tight fit between insert 34 and combination plate 24 and flange 14. The maximum dimension for clearance gap 44 is preferably equal to or less than about 0.003 inches (0.076 mm). The measurement for clearance gap 42 is less critical, but it is preferred to be approximately the same as the measurement for clearance gap 44. The clearance allows for the insertion of insert 34 into the aperture contained in combination plate 24. Clearance gaps 42, 44 will cease to exist as the material from insert 34 and combination plate 24 fuse together during the repair weld.

Front end 40 of combination plate 24 is contoured to mate with remaining surface 46 of flange 14 and hole 12. Although flange 14 is illustrated in this view as containing a radius at surface 46, other geometries of the contour are envisioned including bevels, chamfers, rabbets, dados, or stepped notches, the geometry of the contour depending on the geometry of the base material left on flange 14. Insert 34 and combination plate 24 contain more material than the thickness of the material removed from flange 14 so that insert 34 can be machined to the appropriate size after the weld repair has been completed.

The part illustrated in FIG. 9 is a section of nozzle support 10 of FIG. 2. Nozzle support 10 contains two flanges, flange 14 which is to be repaired, and a lower flange 20. Lower flange 20 and flange 14 are spaced close together, and a typical spacing is less than about 0.25 inches. Backing plate 36 is placed between flange 14 and lower flange 20, and protects the lower flange 20 from any slag, spatter, or similar byproduct resulting from the welding process.

An air gap 48 is left between the top surface of backing plate 36 and the bottom surfaces of insert 34, combination plate 24, and the remaining portion of flange 14. In some embodiments, air gap 48 is about 0.10 inches or less, which assures that the excess energy from the weld beam is adsorbed, but is far enough from the bottom edge of the repair pieces (insert 34, combination plate 24, and flange 14) to assure that backing plate 36 does not become fused to the repair pieces. Utilizing combination plate 24 to provide a good weld, while separating the repair pieces from the backing plate 36 via air gap 48, assures that a good, structurally sound weld repair can be obtained. Backing plate 36 should be large enough to cover the clearance gaps 42, 44 between the combination plate 24 and the edges of the insert all the way around the edge of insert 34. The thickness of backing plate 36 is less than the distance between flange 14 and lower flange 20 so that air gap 48 exists as shown.

Figure 10:
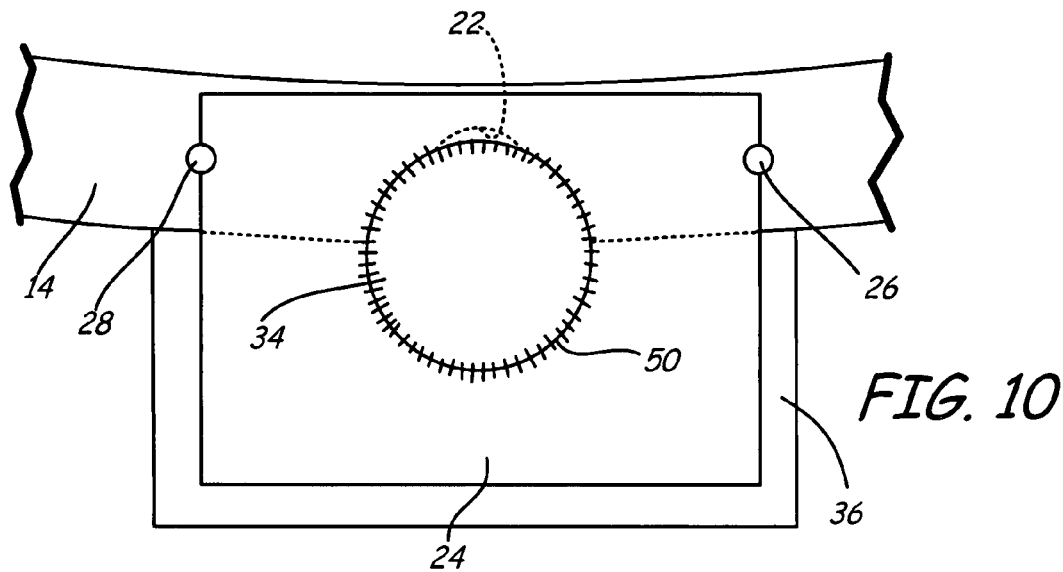
FIG. 10 is a plan view illustrating a completed weld between the insert, combination plate, and flange with the backing plate still in place.

FIG. 10 is a plan view illustrating a completed weld 50 between insert 34 and combination plate 24. Insert 34 is welded into place by a process such as electronic beam welding. Electronic beam welding (EBW) uses a narrow beam of high velocity, high energy electrons to generate the heat necessary to create a weld in a metal work piece. Special equipment is used to focus the electron beam in a vacuum chamber, and the kinetic energy of the electrons is converted to heat energy as it strikes the metal. The welds created by EBW are characteristically deep and narrow with a very small heat affected zone and low distortion. The current repair moves the weld seams out of the high stress areas surrounding the hole 12. The weld seams are left in the low stress areas of the flange 14.

EBW is typically autogenous, that is, does not require a filler material. Thus, a tight fit of insert 34 with the remaining base material and combination plate 24 will occur as the pieces fuse together during the welding process without the addition of a filler material. Weld 50 is a butt weld joining insert 34, base material of flange 14, and combination plate 24 together. While weld 50 is done from the top of insert 34, the weld extends around the entire perimeter of insert 34 and throughout the entire thickness of insert 34.

EBW can leave depressions in the parts welded. Thus, ensuring that insert 34 and combination plate 24 are thicker than the original thickness of flange 14 allows for the melting and fusing of material from the respective top sides of insert 34 and combination plate 24 to flow down and fill in the weld against the base material of flange 14. Thus, when material is removed to finish the repair, none of the base material that has been left will be machined, only the newly welded materials will be removed.

EBW is considered a high energy density welding process and is used extensively in the aerospace industry to join difficult to weld alloys where high quality, low distortion welds are required, such as in the instant case. Those of skill in the art are familiar with the process of electron beam welding, and can perform this repair with an electron beam with a voltage above about 100 kV and a current above about 25 mA. Higher voltage and/or currents are utilized to prevent fusion defects caused when the weld only partially penetrates through the thickness of the repaired part, which can result in reducing the cyclical fatigue life of the joint in the repaired part. The above parameters, as well as other common parameters including travel speed, oscillation, frequency, and focus, can be modified according to principles known to those of skill in the art.

Combination plate 24 and insert 34 can be constructed by fabricating insert 34 out of plate 24 from a single piece of material. That is, a blank is formed which will mate with the outer surface of flange 14. From this blank, a central portion is removed that becomes the insert 34, and the remainder will become combination plate 24. Similarly, combination plate 24 and insert 34 are quicker to assemble, and can be preassembled together. This saves time in repairing hole 12.

Figure 11:
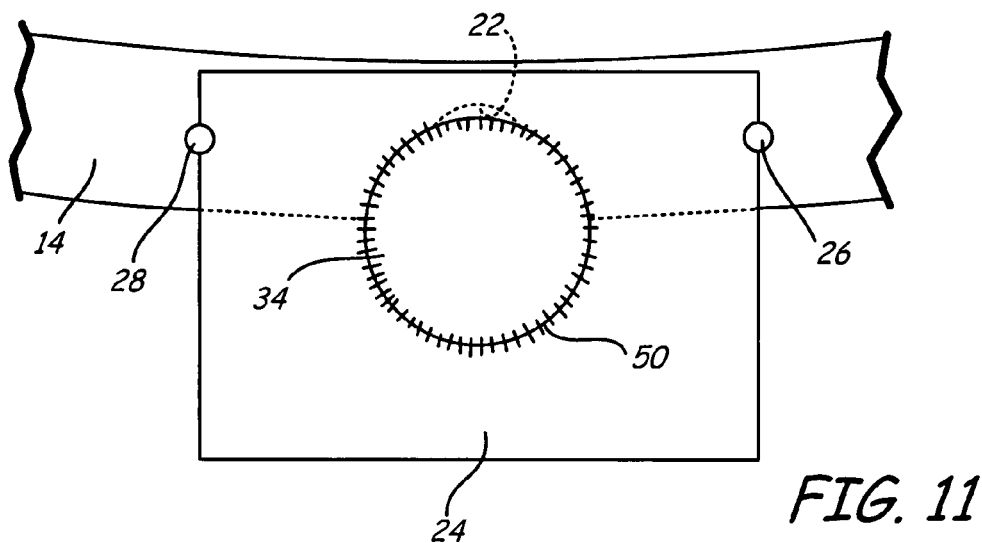
FIG. 11 is a plan view illustrating the completed weld with the backing plate removed.

FIG. 11 is a plan view illustrating completed weld 50 with backing plate 36 removed. Since backing plate 36 does not become fused to the repair pieces (insert 34, combination plate 24, and flange 14), after weld 50 has been completed, backing plate 36 may simply be pulled out from the repaired part. There is no need to use material removal equipment, such as grinders or similar machines to remove backing plate 36. Backing plate 36 may be reused as there will be minimal damage to the top surface as it will not contain removal scars associated with plates that become fused during the welding process.

Figure 12:
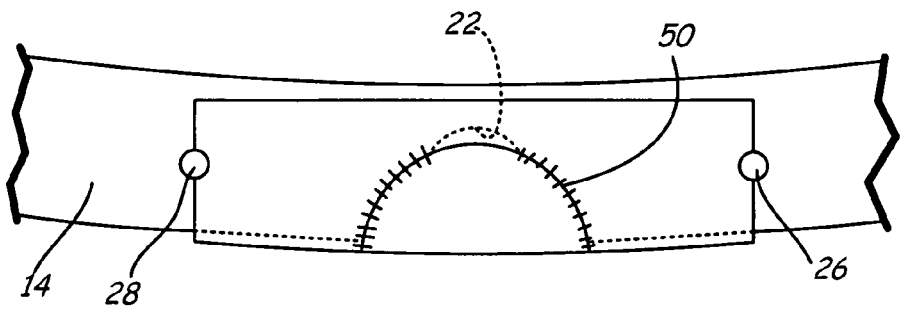
FIG. 12 is a plan view illustrating the completed weld with a portion of the combination plate and insert removed.

FIG. 12 is a plan view illustrating completed weld 50 with portions of combination plate 24 and insert 34 removed. Combination plate 24 and insert 34 are cut along a path that substantially follows the outer profile of flange 14. A mill, laser, or similar material removal machine is used to cut combination plate 24 and insert 34. A nominal amount of material of combination plate 24 and insert 34 may remain after an initial cut to ensure that the cutting process does not affect the integrity of the original flange profile.

Figure 13:
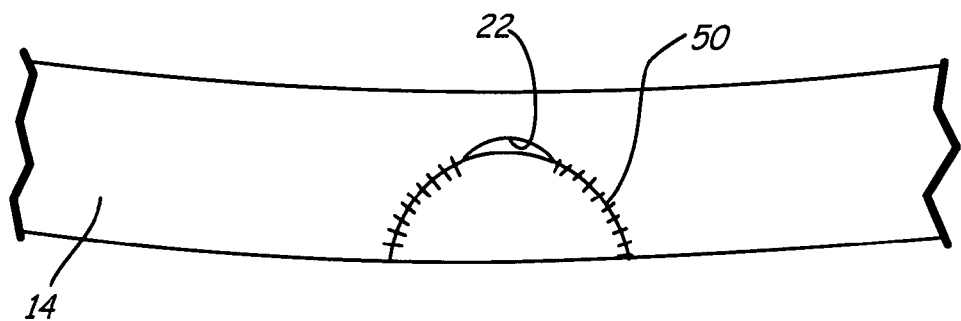
FIG. 13 is a plan view illustrating the combination plate and insert removed to produce the original flange profile.

FIG. 13 is a plan view illustrating combination plate 24 removed to produce the original profile of flange 14. To remove combination plate 24, first tack welds 26, 28 are detached from flange 14. Next, a mechanized process such as machining is utilized to remove combination plate 24 and excess material from insert 34 until the original profile of the top surface of flange 14 is obtained. After combination plate 24 is removed, arc 22 of the original aperture in flange 14 is again visible. Weld 50 will also be machined on the top and bottom surfaces to obtain nominally the same surfaces of flange 14 as those prior to the repair. Finally, the outer edge of flange 24 is machined to obtain substantially the same profile and outer diameter as the profile prior to the repair.

Figure 14:
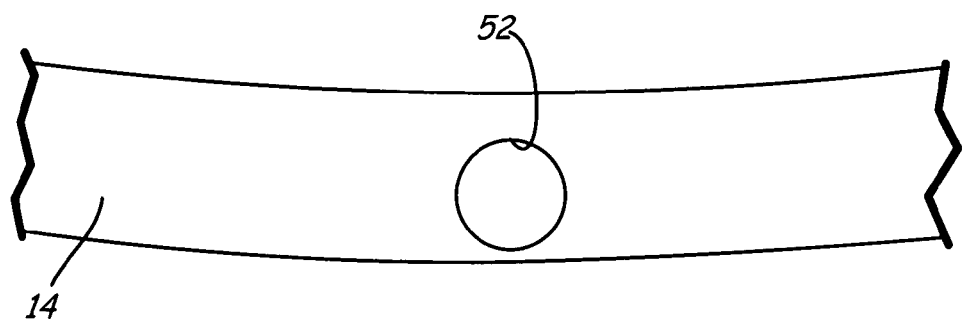
FIG. 14 is a plan view illustrating the complete repair with a new aperture in the flange.

FIG. 14 is a plan view illustrating the complete repair with a new hole 52 in flange 14. After the flange profile has been nominally obtained, an aperture is machined in the flange to create nominally the same hole 12 that existed prior to the repair. Arc 22 is used as a guide to machine hole 52 to assure the location is nominally the same as prior to the repair. In an alternate embodiment, the hole in lower flange 20 (See FIGS. 2A and 9) is used as a guide to create hole 52 in flange 14.

To repair small holes of the forward inner nozzle support, a part is first removed and received for inspection. The part is cleaned to assure all facets can be inspected. Various repairs are done, including the electron beam welding of inserts for the cracked pinholes as described above.

After the part has been welded, the part is then machined to assure the flange is within tolerances. The machining process (or other material removal process) removes excess material from the completed weld and creates a new hole 12 and restores the outer perimeter of flange 14. It is the material from insert 34 that is used to create the repaired flange 14. Combination plate 24 is removed by cutting and extracting the tack welds holding combination plate 24. The portion of plate 24 not needed to create a smooth outer profile for flange 24 is removed. Finally, the remaining material from insert 34 is machined down to create a new, refurbished flange 14, and hole 12 is refabricated.

After material removal is complete, a further inspection is done. Known nondestructive inspection (NDI) techniques, such as visual inspection, fluorescent penetrant inspection (FPI), eddy current inspection, ultrasonic inspection and x ray inspection, etc. can be used. The inspection assures the part is back to near identical dimensions that the part had prior to the repair. It is important that the minimum edge distance from the flange outer diameter to the aperture is maintained after the repair as the fatigue life of the part will be greatly reduced if the dimensions are varied from the original specifications. Upon passing a final inspection, the part may be replaced within the turbine.

On a part that contains holes next to a flange, such as the forward inner nozzle support illustrated in FIG. 2, defects often appear after extended use. Typically, the defect is a crack that initiates from one of the apertures in the flange and propagates towards the outer diameter of the flange. The crack is likely created by a thermal cycle hoop stress and the load on the pin through the flange on the attached vane. The stress around the hole is highest adjacent the outer diameter of the flange. Utilizing an insert with the above mentioned method to create the repair results in a weld that is similar to that achieved with the known wedge repair for larger holes. The resultant weld is approximately at 45° on either side of the radial centerline of the hole. This moves the weld out of the highest stress areas surrounding the hole to the lower stress areas of the base material, which results in improved fatigue life for the repaired hole. At the same time, the weld is accomplished with a continuous movement of the part in an arced path under the electron beam rather than requiring separate line welds such as associated with the prior art wedge repair processes. With such a small area in the current repair, an abrupt change in the weld path would result in an uneven weld where the weld beam must pause to change direction.

The current repair will not degrade the fatigue life of the part, and thus the life of the part is renewed with the section replacement of the defect near the aperture. The fatigue life of the repaired part is substantially restored to that of the original part.

Although the present invention has been described with reference to preferred embodiments, workers skilled in the art will recognize that changes may be made in form and detail without departing from the spirit and scope of the invention.

The invention claimed is:

1. A method of repairing an aperture and adjacent defect, the method comprising:
   removing one or more defects adjacent an aperture in a base material, wherein the material is removed to create a weld seam that extends past an area of high stress concentration on the aperture;
   providing an insert of material containing a profile that corresponds to the profile of the base material removed adjacent the aperture;
   providing a combination top and runoff plate that encompasses the insert of material;
   tacking the insert of material to the combination plate to assure a gap of less than about 0.003 inches between the combination plate and the insert, wherein tacking creates a plurality of tack welds that are located between the outer edge of the part and the original location aperture;
   inserting a backing plate underneath the combination top and runoff plate and insert such that there remains an air space between the backing plate and the combination top and runoff plate to prevent the combination top and runoff plate from becoming fused to the backing plate during a welding process;
   welding the insert to the base material;
   removing the backing plate;
   removing material from the insert to obtain an aperture containing a profile essentially the same as the profile of the aperture prior to initiating the repair.

2. The repair of method 1 wherein removing the defects leaves at least a portion of the original aperture in the base material.

3. The repair method of claim 1 wherein welding the insert comprises butt welding the insert to the base material.

4. The repair method of claim 1 wherein the aperture contains a gap less than about 0.003 inches from the insert.

5. The repair method of claim 1 wherein the plurality of tack welds are incorporated into the weld seam between the insert and the combination plate.

6. The method of claim 1 wherein welding the insert is done by electron beam welding.

7. The method of claim 1 wherein the insert and combination top and runoff plate contain essentially the same metallurgical properties as the base material.

8. A method of repairing an aperture and adjacent defect in a flange, the method comprising:
   removing one or more defects in a base material of the flange adjacent an aperture wherein a portion of the aperture is left in the base material;
   providing an insert of material containing a profile that corresponds to a profile of the base material removed adjacent the aperture;
   providing a combination top and runoff plate that encompasses the insert of material;
   tacking the insert of material to the combination plate, wherein one tack weld is between the outer edge of the flange and the portion of the aperture remaining, and a second tack weld is between the outer edge of the flange and the opposite side of the portion of the aperture remaining;
   welding the insert to the base material and combination plate;
   removing material from the insert and combination plate to obtain an aperture and a surrounding section containing a profile with essentially the same profile of the aperture and surrounding section prior to initiating the repair.

9. The repair of method 8 wherein tacking the insert further comprises:
leaving a gap of not more than about 0.003 inches between the insert and the combination plate.

10. The repair of method 8 wherein removing one or more defects comprises removing enough base material to create a weld seam that extends away from an area of high stress concentration proximate the aperture.

11. The repair method of claim 10 wherein the tack welds are incorporated into the weld seam.

12. The repair method of claim 8 wherein the aperture contains a diameter less that about 0.30 inches.

13. The repair method of claim 8 wherein the welding process used is electron beam welding.

14. The method of claim 8 wherein the depth of the tack welds does not exceed the thickness of the combination plate.

15. The repair method of claim 8 wherein the tack welds are created using spot welding.

* * * * *